Oct. 4, 1949.  H. E. JACOT  2,483,639
LEATHER MEASURING GAUGE
Filed June 1, 1948
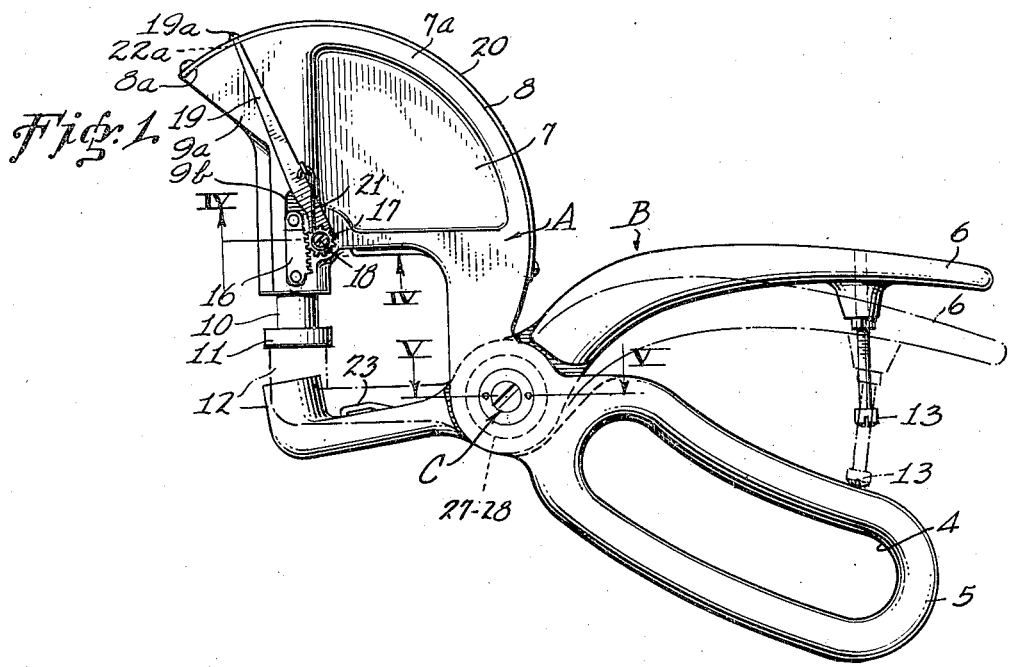
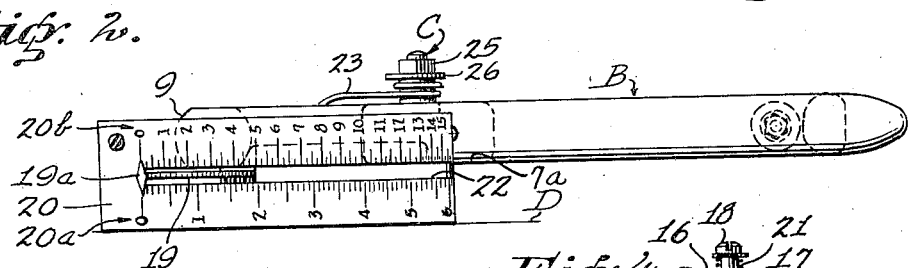
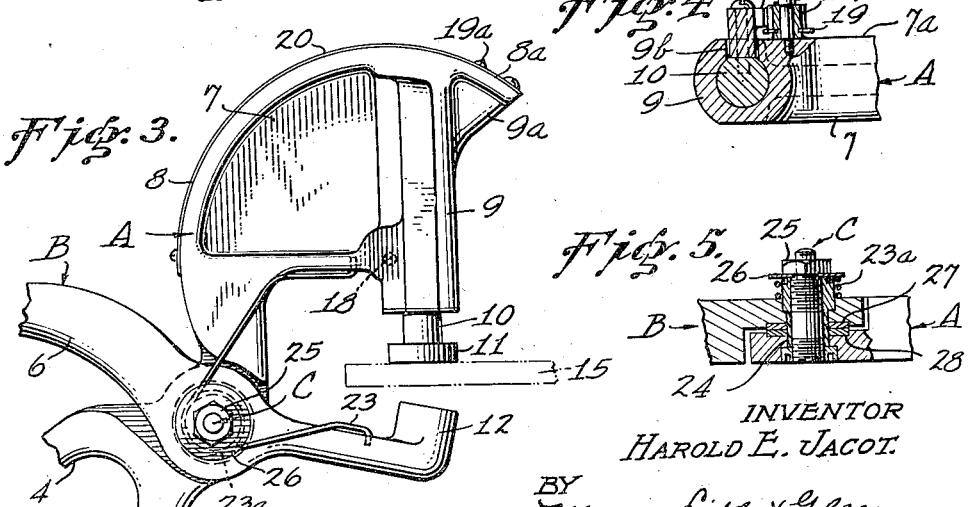
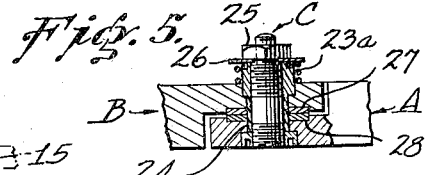
INVENTOR
HAROLD E. JACOT.
BY Munn, Liddy & Glaccum
ATTORNEYS.

Patented Oct. 4, 1949

2,483,639

UNITED STATES PATENT OFFICE 2,483,639

LEATHER MEASURING GAUGE

Harold E. Jacot, Napa, Calif., assignor to Sawyer Tanning Company, Napa, Calif.

Application June 1, 1948, Serial No. 30,372

1 Claim. (Cl. 33—148)

The present invention relates to improvements in a leather measuring gauge. It has particular reference to structural improvements over the gauge shown in United States Patent No. 1,874,677, of Thomas Cook Wetmore, assignor to Sawyer Tanning Company, of Napa, California, which patent was issued on August 30, 1932.

As compared with the gauge disclosed in the above-mentioned patent, it is proposed in the present invention to provide a gauge that is more convenient to grip, and which is made in such a manner as to reduce wear on the main castings.

A further object of the present invention is to provide a gauge that will indicate both the thickness of leather in millimeters and weight thereof in ounces. The plate on which the graduations are formed serves as a guide for a moveable pointer and protects the pointer against damage Other objects and advantages will appear as the specification continues, and the novel features will be set forth in the claim hereunto appended.

For a better understanding of my invention, reference should be had to the accompanying drawing, forming part of this application, in which:

Figure 1 is a side elevation of my leather measuring gauge;

Figure 2 is a top plan view thereof;

Figure 3 is a fragmentary view of the opposite side of the gauge from that shown in Figure 1; and Figures 4 and 5 are horizontal sectional views taken along the lines IV—IV and V—V, respectively, of Figure 1.

While I have shown only the preferred form of my invention, it should be understood that various changes, or modifications, may be made within the scope of the appended claim without departing from the spirit thereof.

Referring to the drawing, it will be noted that I provide members A and B that are pivotally secured together by a bolt indicated at C. The member A has an elongated opening 4 in its handle portion 5 for receiving the fingers of an operator's hand, while the member B has a handle portion 6. These handles are fashioned so as to be conveniently gripped by the operator.

The member A has a head 7 provided with an arcuate-shaped portion 8 and a substantially cylindrical portion 9, the latter being suitably reinforced as shown in Figures 1 and 3. This head is fashioned with a nose 9a projecting forwardly beyond the cylinder 9 with its upper surface 8a forming a continuation of the arcuate-shaped portion 8.

Within the cylinder 9 I mount a piston 10. The lower end of the piston carries a head 11 that abuts a head 12 of the member B when the handles 5 and 6 are moved toward one another, as suggested by the dot-dash lines in Figure 1. An adjusting screw 13 strikes the handle 5 when the head 12 just abuts the head 11. Therefore, there will be no movement of the piston 10, unless a piece of leather 15 (see Figure 3) is placed between the heads 11 and 12.

When a piece of material is placed between the two heads 11 and 12, the head 11 is moved upwardly and this head carries with it the piston 10. A one piece rack 16 is secured to the piston and meshes with a pinion 17. This rack is slidably disposed in a slot 9b provided in the wall of the cylinder 9 (see Figures 1 and 4) and is urged to a normal position at the lower end of the slot. The pinion is rotatably mounted on a cap-screw 18 projecting from the head 7. This pinion is crimped over a pointer 19 so as to secure the latter thereto (see Figure 4).

The movement of the rack will swing the indicator 19a of the pointer over a scale plate 20 secured to the curved edges 8 and 8a. The plate 20 may be made of considerable length, since it extends at one end over the nose 8a and its opposite end extends downwardly along the curved edge 8 well toward the bolt C. This provides a long sweep for the indicator. A spring 21 will return the indicator of the pointer back to a 0 reading and the head 11 into the position shown in Figures 1 and 3.

It will be noted that the plate 20 is formed with a slot 22 therein. The pointer 19 is disposed adjacent to the flat surface 7a of the head 7 and rests against the end wall 22a of the slot when the indicator 19a is disposed opposite the 0 reading on the scale plate. The slot 22 forms a guide in which the pointer is moveable. The plate 20 protects the pointer from being distorted and accidentally flexed away from the head 7. Figure 2 illustrates the plate 20 as extending beyond the head 7 so as to provide a protective shield over the pointer. This shield will protect the rack 16 and pinion 17 when the device is placed on a supporting surface D.

Referring to Figure 2, it will be noted that the scale plate is provided with rows of graduations 20a and 20b, for indicating millimeters and ounces, respectively, of the leather being measured.

A spring 23 urges the handles 5 and 6 into open position when they are freed, thus retracting the head 12 relative to the head 11. This permits a strip of material, such as indicated at 15, to be placed between the heads 11 and 12 and quickly measured. The measuring is accomplished by swinging the handles 5 and 6 toward one another until the screw 13 abuts the handle 5, and then reading the position of the indicator 19a on the graduations 20a and 20b.

Figure 5 discloses a tubular bronze bushing 24 passing through aligned openings in the members A and B. The bolt C extends through this bushing and has a nut 25 thereon for holding a washer 26 up against one end of the bushing 24. The intermediate portion of the spring 23 is coiled at 23a around the projection end of the bushing 24 between the member B and the washer 26 (see Figure 5). Brass and steel washers 27 and 28 are inserted between the members A and B at the hinge pin to reduce wear therebetween.

Having thus described the various parts of my gauge, the adjustment and operation thereof is summarized briefly as follows:

The screw 13 is adjusted so that it will strike the handle 5 at the time the head 12 just contacts the head 11 without any leather being interposed between these heads. At this time, the indicator 19a is set to the 0 readings on the graduations 20a and 20b (see Figure 2).

When the operator desires to determine the weight or thickness of a piece of leather 15, the latter is placed between the heads 11 and 12. The handles 5 and 6 are drawn together to the full extent permitted by the screw 13. This will result in moving the head 11 upwardly by an amount equal to the thickness of the leather, which will displace the pointer 19a over the graduations 20a and 20b to indicate the thickness of the leather in millimeters and the weight of the leather in ounces.

I claim:

A gauge comprising two members pivotally secured together and provided with handles; a fixed head carried by one member to engage with the underneath surface of a leather sheet, or the like, to be measured; a curved head fixed to the other member to overlie the leather sheet; the curved head having an arcuate-shaped portion of a length exceeding a quadrant of a circle; the curved head having a side face with a flat surface extending along the entire length of the arcuate portion thereof; a curved strip-like scale plate removably mounted on the arcuate portion of the curved head and projecting laterally beyond said flat surface to define a shield with an entirely-opened side; a spring-pressed movable head disposed above the leather sheet and carried by the curved head; said movable head being urged to a normal position toward the fixed head that underlies the leather sheet; the scale plate having a slot extending lengthwise thereof adjacent to said flat surface of the curved head; a pointer operatively connected to the movable head and disposed adjacent to said flat surface of the curved head to move therealong; the pointer having an indicator projecting through and guided by the slot in the scale plate and movable over the scale; the pointer being confined within the lateral space between said flat surface of the curved head and the outermost lateral edge of said shield, whereby the pointer will be protected against damage when said lateral edge is placed upon a supporting surface; and stop means for preventing movement of the handles toward each other beyond the travel necessary to bring the movable head and the fixed head that normally underlies the leather sheet into contacting relation in the absence of the leather sheet therebetween; said movable head being displaced relative to the member by which it is carried when the leather sheet is introduced between the movable head and the fixed head underneath the leather sheet and the members are moved to grip the leather sheet and thereby displace the movable head until said stop means become active.

HAROLD E. JACOT.

REFERENCES CITED

The following references are of record in the file of this patent:

UNITED STATES PATENTS

| Number | Name | Date |
|---|---|---|
| 564,235 | Tidd | July 21, 1896 |
| 1,097,797 | Gheen | May 26, 1914 |
| 1,436,111 | Reich | Nov. 21, 1922 |
| 1,874,677 | Wetmore | Aug. 30, 1932 |
| 1,981,153 | Schoof | Nov. 20, 1934 |
| 2,091,376 | Reich | Aug. 31, 1937 |
| 2,106,652 | Pinson | Jan. 25, 1938 |
| 2,235,321 | Krumm | Mar. 18, 1941 |